US 8,820,638 B1

(12) United States Patent
Cotter et al.

(10) Patent No.: US 8,820,638 B1
(45) Date of Patent: Sep. 2, 2014

(54) SYSTEM AND METHODS RELATED TO AN AVAILABLE BALANCE DEBIT/CREDIT CARD

(75) Inventors: Judy Margaret Cotter, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 39 days.

(21) Appl. No.: 11/829,838

(22) Filed: Jul. 27, 2007

(51) Int. Cl.
*G06K 5/00* (2006.01)
*G06K 19/06* (2006.01)
*G06Q 40/00* (2012.01)

(52) U.S. Cl.
USPC .......... 235/380; 235/492; 235/382; 340/5.41; 340/5.82; 705/41; 705/68

(58) Field of Classification Search
USPC ............ 235/379, 380, 487, 492, 493; 705/39, 705/41, 42, 35, 68, 44, 67; 455/556.1, 558; 340/5.4, 5.41, 5.42, 5.52, 5.53, 5.82, 340/5.83, 5.84
See application file for complete search history.

(56) References Cited

U.S. PATENT DOCUMENTS

| | | | | |
|---|---|---|---|---|
| 4,614,861 A | * | 9/1986 | Pavlov et al. | 235/380 |
| 4,746,787 A | * | 5/1988 | Suto et al. | 235/379 |
| 4,868,376 A | | 9/1989 | Lessin et al. | |
| 4,954,985 A | | 9/1990 | Yamazaki | 365/108 |
| 5,221,838 A | * | 6/1993 | Gutman et al. | 235/379 |
| 5,412,192 A | * | 5/1995 | Hoss | 235/380 |
| 5,521,363 A | * | 5/1996 | Tannenbaum | 235/379 |
| 5,644,118 A | * | 7/1997 | Hayashida | 235/379 |
| 5,777,903 A | * | 7/1998 | Piosenka et al. | 708/100 |
| 5,857,079 A | * | 1/1999 | Claus et al. | 705/33 |
| 6,016,954 A | | 1/2000 | Abe et al. | 235/379 |
| 6,105,006 A | * | 8/2000 | Davis et al. | 705/35 |
| 6,250,557 B1 | * | 6/2001 | Forslund et al. | 235/492 |
| 6,336,586 B1 | | 1/2002 | Shriver | 235/380 |
| 6,353,889 B1 | * | 3/2002 | Hollingshead | 713/169 |

(Continued)

FOREIGN PATENT DOCUMENTS

JP 63091793 A * 4/1988
WO WO 2004079611 A1 * 9/2004

OTHER PUBLICATIONS

Anonymous, "News: VISA Experiments with Credit Card Display," Warp2Search.Net, http://www.warp2search.net/modules.php?name=News&file=article&sid=17717, 2003, downloaded Jul. 12, 2007, 3 pages.

(Continued)

*Primary Examiner* — Michael G Lee
*Assistant Examiner* — Suezu Ellis
(74) *Attorney, Agent, or Firm* — Fish & Richardson P.C.

(57) ABSTRACT

A wirelessly updated consumer spending card includes a spending card housing, a memory module on the spending card housing, a processor module on the spending card housing in operable communication with the memory module, an output display on the spending card housing in operable communication with the processor, a transceiver on the spending card housing operable for wirelessly transmitting and receiving data across a metropolitan area in operable communication with the processor and display, and a power source on the spending card housing in operable connectivity to the memory, processor, transceiver and display. The card may further include a biometric input device on the spending card housing in operable communication with the processor.

13 Claims, 12 Drawing Sheets

(56) References Cited

U.S. PATENT DOCUMENTS

| | | | |
|---|---|---|---|
| 6,360,954 B1* | 3/2002 | Barnardo | 235/492 |
| 6,845,906 B2 | 1/2005 | Royer et al. | |
| 6,954,133 B2* | 10/2005 | McGregor et al. | 340/5.26 |
| 7,004,385 B1* | 2/2006 | Douglass | 235/379 |
| 7,039,440 B2 | 5/2006 | Rodriguez et al. | |
| 7,097,108 B2* | 8/2006 | Zellner et al. | 235/492 |
| 7,191,952 B2 | 3/2007 | Blossom | 235/492 |
| 7,240,846 B2* | 7/2007 | Arisawa et al. | 235/492 |
| 7,249,112 B2 | 7/2007 | Berardi et al. | |
| 7,251,501 B2* | 7/2007 | Halpern | 455/558 |
| 7,314,164 B2 | 1/2008 | Bonalle et al. | |
| 7,360,688 B1* | 4/2008 | Harris | 235/380 |
| 7,440,771 B2* | 10/2008 | Purk | 455/556.1 |
| 7,516,884 B2* | 4/2009 | Chase-Salerno et al. | 235/380 |
| 7,578,437 B2* | 8/2009 | Lu et al. | 235/380 |
| 8,025,226 B1* | 9/2011 | Hopkins et al. | 235/384 |
| 8,511,547 B2* | 8/2013 | Rans et al. | 235/380 |
| 2002/0032601 A1* | 3/2002 | Admasu et al. | 705/13 |
| 2003/0200180 A1 | 10/2003 | Phelan et al. | |
| 2004/0050930 A1 | 3/2004 | Rowe | |
| 2005/0077348 A1* | 4/2005 | Hendrick | 235/380 |
| 2005/0240778 A1* | 10/2005 | Saito | 713/186 |
| 2006/0000899 A1* | 1/2006 | Bonalle et al. | 235/380 |
| 2006/0117186 A1* | 6/2006 | Yeo | 713/182 |
| 2006/0258337 A1* | 11/2006 | Fujita et al. | 455/414.1 |
| 2007/0055630 A1* | 3/2007 | Gauthier et al. | 705/44 |
| 2007/0057038 A1* | 3/2007 | Gannon | 235/380 |
| 2007/0073619 A1* | 3/2007 | Smith | 705/41 |
| 2007/0136194 A1 | 6/2007 | Sloan | |
| 2007/0138299 A1* | 6/2007 | Mitra | 235/492 |
| 2007/0175983 A1* | 8/2007 | Klug | 235/380 |
| 2007/0278291 A1* | 12/2007 | Rans et al. | 235/380 |
| 2007/0283145 A1* | 12/2007 | Gressel et al. | 713/164 |
| 2008/0028230 A1* | 1/2008 | Shatford | 713/186 |
| 2008/0156885 A1 | 7/2008 | Landau et al. | |
| 2009/0143104 A1* | 6/2009 | Loh et al. | 455/558 |

OTHER PUBLICATIONS

Accela Communications, Inc., "Visa toys with credit card displays," itworld.com, http://www.itworld.com/Tech/2987/040429visadisplay/pfindex.html, Apr. 29, 2004, downloaded Jul. 11, 2007, 2 pages.

"Debit card displays balance," *Halfbakery*, http://www.halfbakery.com/idea/Debit_20card_20displays_20balance, 2004, downloaded Jul. 12, 2007, 2 pages.

Gemalto: security to be free, "Contactless payment solutions: Convenient and fast payment transactions," http://www.gemalto.com/brochures/download/contactless_payment.pdf, Nov. 2006, downloaded Jul. 11, 2007, 2 pages.

MasterCard Worldwide, "MasterCard® PayPass™," http://www.paypass.com/, downloaded Jul. 11, 2007, 2 pages.

OLED-info.com, "SecureCard credit card," http://www.oled-info.com/design_sketches/securecard_credit_card, Nov. 11, 2006, downloaded Jul. 11, 2007, 1 page.

Stensgaard, A-B., "Biometric breakthrough—credit cards secured with fingerprint recognition made feasible," *AME Info FZ LLC / EMAP Communications*, http://www.ameinfo.com/58236.html, updated Nov. 13, 2006, downloaded Jul. 11, 2007, 3 pages.

Solicore™, "Solicore: Different Down to the Core," http://www.solicore.com/product.html, Feb. 12, 2007, downloaded Jul. 11, 2007, 1-23.

Vacherand, F., "Technological Trends for Smart Card Chips: New Emerging Technologies for Secure Chips and Smart Cards," *Minatec*, Sep. 22-26, 2003, downloaded Jul. 11, 2007, 1-24.

* cited by examiner

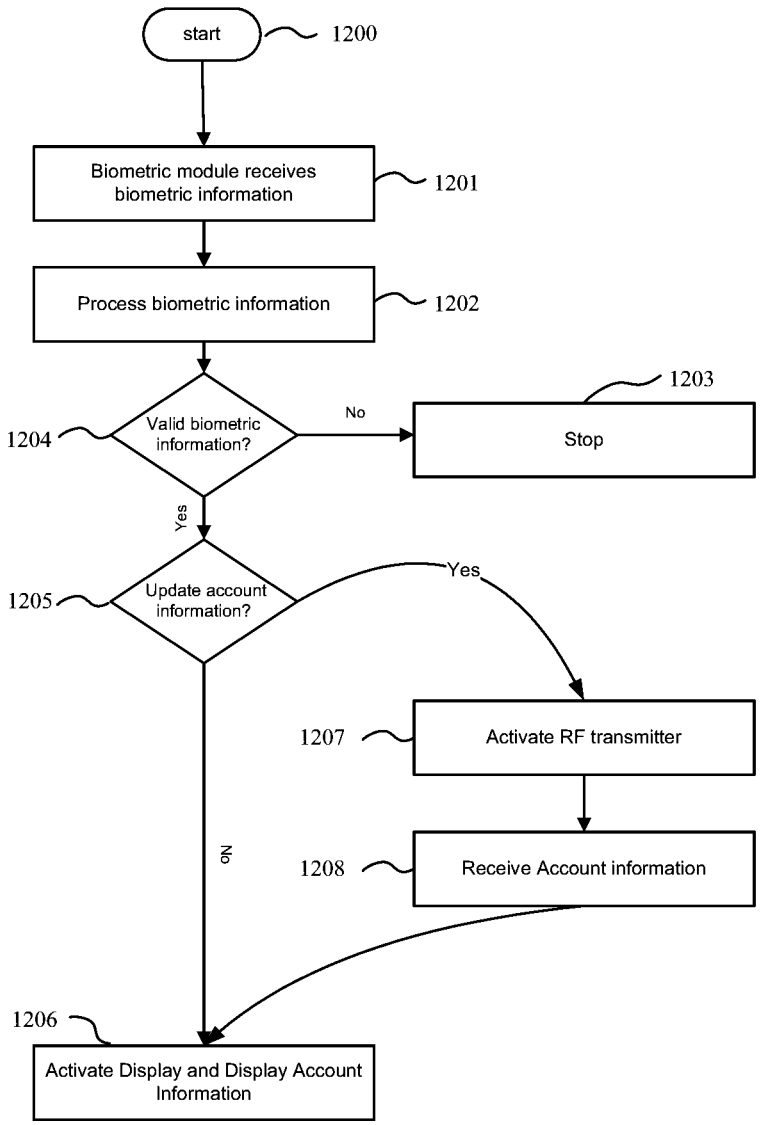

US 8,820,638 B1

SYSTEM AND METHODS RELATED TO AN AVAILABLE BALANCE DEBIT/CREDIT CARD

CROSS-REFERENCE TO RELATED SUBJECT MATTER

This application is related to subject matter disclosed in the following commonly assigned applications: U.S. patent application Ser. No. 11/829,835, filed Jul. 26, 2007, entitled "System and Methods Related To An Available Balance Debit/Credit Card"; and U.S. patent application Ser. No. 11/829,842, filed Jul. 26, 2007, entitled "System and Methods Related To An Available Balance Debit/Credit Card." The contents of each of the above-referenced U.S. patent applications are herein incorporated by reference in their entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007, USAA.

BACKGROUND

Consumers are often in need of account and other information regarding their debit/credit card. This may include items such as account status, available balance and other information. Currently, card holders either call or log on to their account over the internet to get the desired information regarding their account. Also, financial institutions and card issuers are in constant searches for new and effective ways to get relevant information to their card holders such as offers for new products and other marketing information that may be of interest to particular customers. Currently, the main forms of communication between the card holders and the financial institutions is by phone, mail, or internet. These methods are often inconvenient and costly for both the financial institution and card holder.

Thus, needed are processes and a system that address the shortcomings of the prior art.

SUMMARY

In one embodiment, a wirelessly updated consumer spending card includes, but is not limited to, a housing; a memory module integrated with the housing; a processor coupled to the memory module; one or more displays integrated with the housing operably coupled to the processor; a transceiver integrated with the housing configured to wirelessly receive account information from a remote device over a cellular network; and a power source integrated with the housing operably coupled to the memory module, the processor, the transceiver, and the one or more displays.

It can be appreciated by one of skill in the art that one or more various aspects of the disclosure may include, but are not limited to, circuitry and/or programming for effecting the herein-referenced aspects; the circuitry and/or programming can be virtually any combination of hardware, software, and/or firmware configured to effect the herein-referenced aspects depending upon the design choices of the system designer. In addition to the foregoing, other aspects are described in the claims, drawings, and text forming a part of the present application.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 12 is a flow diagram illustrating an example process in which the wirelessly updated credit/debit card of FIG. 3 utilizes biometric security features;

DETAILED DESCRIPTION OF ILLUSTRATIVE EMBODIMENTS

Example Computing Devices and Environment

Figure 1:
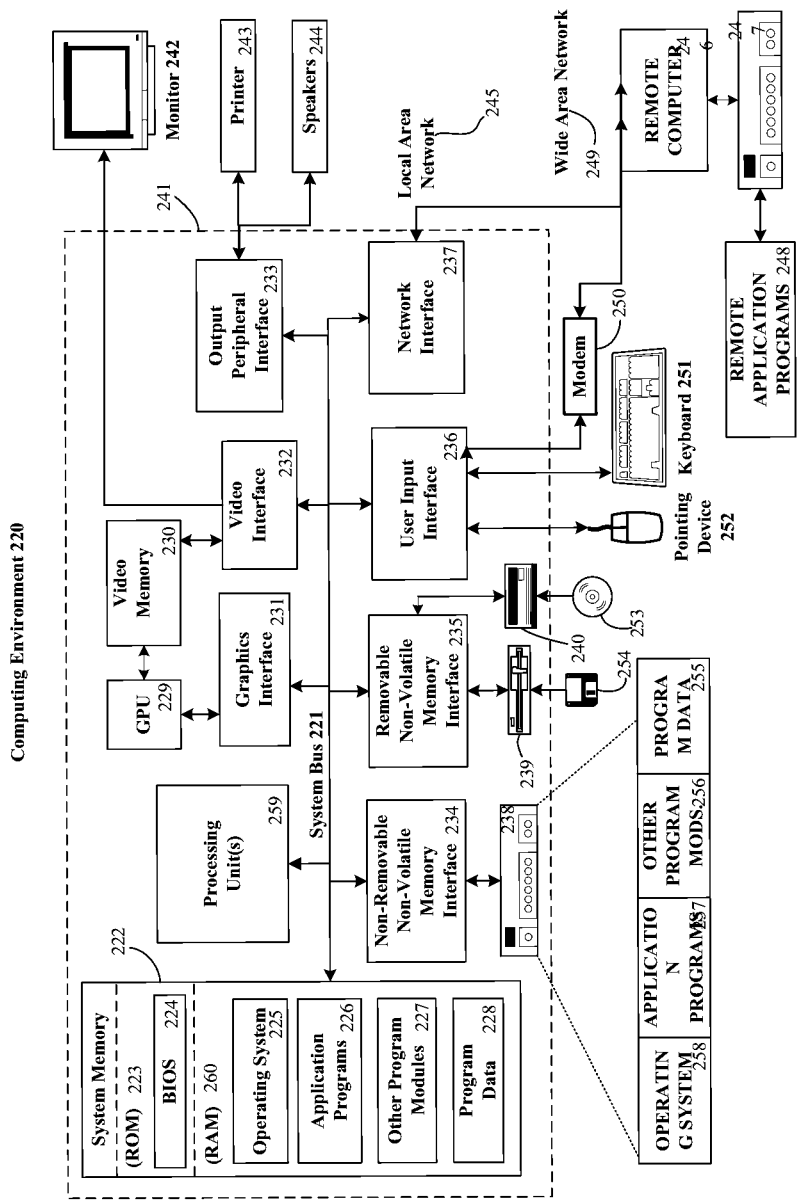
FIG. 1 is a block diagram representing an exemplary computing device suitable for use in conjunction with providing a system with which the wirelessly updated credit/debit card can communicate and receive updates.

Referring to FIG. 1, shown is a block diagram representing an exemplary computing device suitable for use in conjunction with providing a system with which a wirelessly updated credit/debit card can communicate and receive updates. For example, the computer executable instructions that carry out the processes and methods to communicate updates to a wirelessly updated credit/debit card may reside and/or be executed in such a computing environment as shown in FIG. 1. The computing system environment 220 is only one example of a suitable computing environment and is not intended to suggest any limitation as to the scope of use or functionality of the disclosed technology. Neither should the computing environment 220 be interpreted as having any dependency or requirement relating to any one or combination of components illustrated in the exemplary operating environment 220.

Aspects of the disclosed technology are operational with numerous other general purpose or special purpose computing system environments or configurations. Examples of well known computing systems, environments, and/or configurations that may be suitable for use with the disclosed technology include, but are not limited to, personal computers (PCs), server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the disclosed technology may be implemented in the general context of computer-executable instructions, such as program modules, being executed by a computer. Generally, program modules include routines, programs, objects, components, data structures, etc. that perform particular tasks or implement particular abstract data types. Aspects of the disclosed technology may also be practiced in distributed computing environments where tasks are performed by remote processing devices that are linked through a communications network. In a distributed computing environment, program modules may be located in both local and remote computer storage media including memory storage devices.

An exemplary system for implementing aspects of the disclosed technology includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard. In some embodiments, the exemplary system may additionally include a graphics interface 231 that renders graphics, video memory 230 that can be used to cache graphics, and a GPU 229 that executes the instructions to render graphics.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, long and short range radio frequency (RF), infrared, and other wireless media. Combinations of any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above, and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosed technology, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the disclosure in the context of one or more stand-alone computer systems, the disclosure is not so limited, but rather may be implemented in connection with any computing environment, such as a network or distributed computing environment. Still further, aspects of the disclosure may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
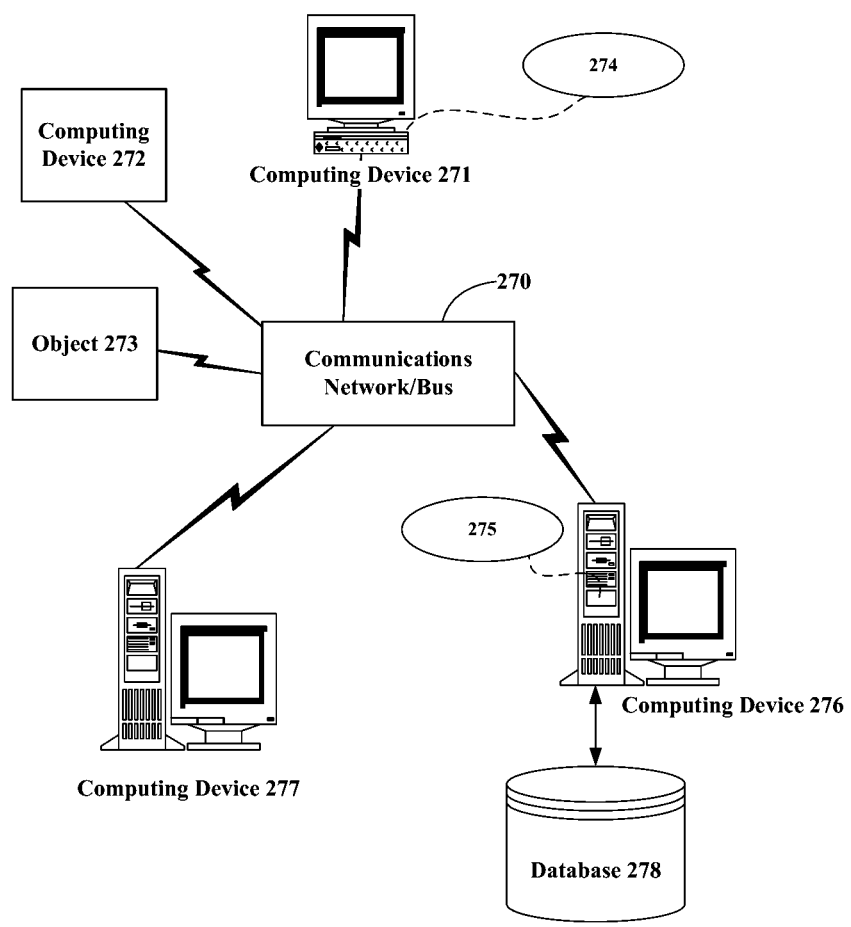
FIG. 2 illustrates an exemplary networked computing environment of which the wirelessly updated credit/debit card may be a part and in which many computerized processes may be implemented to provide updates to the wirelessly updated credit/debit card.

Referring next to FIG. 2, shown is an exemplary networked computing environment of which the wirelessly updated credit/debit card may be a part of, and in which many computerized processes may be implemented to provide updates to the wirelessly updated credit/debit card. For example, object 273 may represent a wirelessly updated credit/debit card as one of the various clients on the network of FIG. 2 using and/or implementing systems that provide the means of communication between various clients and servers on the network. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, music players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the disclosure, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the disclosure should not be limited to any single embodiment, but rather should be construed in breadth and scope in accordance with the appended claims.

Wirelessly Updated Credit/Debit Card with Display

Figure 3:
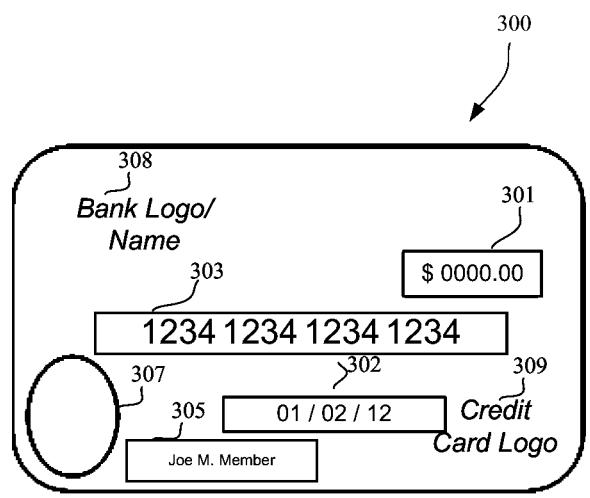
FIG. 3 is a front exterior view of an example wirelessly updated credit/debit card with a dynamic display.

Referring next to FIG. 3, it illustrates a front exterior view of an example wirelessly updated credit/debit card 300 with one or more displays. In this example embodiment, the card 300 may include one or more displays 301, 302, 303, and/or 305 that can be activated and display the available balance of the card 301, a card account number 303, the card holder's name 305, and/or card's expiration date 302. Additionally, one skilled in the art will appreciate that the entire front panel of the card may be a display, and the example card disclosed is not a limiting example. In addition to the one or more displays, the card 300 may include a biometric input area (e.g., thumbprint reader) 307, an area for the bank or financial institution's name and/or logo 308, and an area for the credit card network name and/or logo 309 (which is often a holographic image). The card 300 may be approximately the size of a standard sized credit card. For example, the ID-1 format of the International Organization for Standardization (ISO) 7810 specifies a size of 85.60×53.98 mm (3.370×2.125 in) with a thickness of 0.76 mm and corners rounded with a radius of 3.18 mm. This size is commonly used for banking cards (ATM cards, credit cards, debit cards, etc.) and is suitable for the example wirelessly updated credit/debit card with a dynamic display described herein. However, other sizes and standards for identification or banking cards may also be suitable.

As illustrated in FIG. 3, the one or more displays, 301, 302, 303, and/or 305 may be any thin film display that is able to be integrated with a credit/debit card 300 of the approximate size described above. For example, aspects of the present disclosure may utilize displays that comprise a thin, flexible display, such as a light-emitting polymer (LEP) display for displaying information denoting account information, and/or other information. The LEP display may cover, for example, a portion of the surface of the card 300, i.e., section 301, section 303, etc., or one display may cover the whole surface of at least one side of the card 300 (not shown). Also, the display may be touch-sensitive, e.g., it may provide the user with a number of graphical images which enable the user to selectively chose a card feature by touching selected parts of the touch-sensitive display.

The card can include a microprocessing unit (MPU) for executing instructions stored in a memory, a liquid crystal display (LCD), coupled to the MPU for displaying information, a keypad coupled to the MPU and to the display for entering data by the user, an interface for transferring signals between the card and an external system such as a card reader, a point of sale terminal (POS) terminal, or an automated teller machine when the smart card is in short range of the external system. The card can include photovoltaic cells for providing power to the card when the card is exposed to light.

Figure 4:
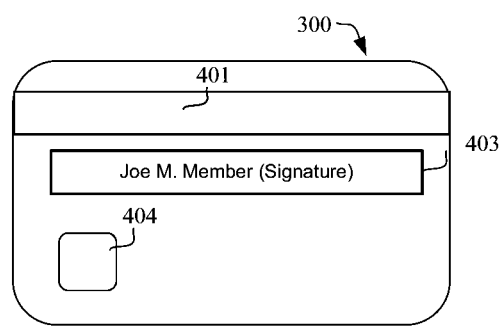
FIG. 4 is a back exterior view of the example wirelessly updated credit/debit card with a dynamic display of FIG. 3.

Referring next to FIG. 4, shown is a back exterior view of the example wirelessly updated credit/debit card with a dynamic display of FIG. 3. Shown is a credit card magnetic strip area 401, a card holder signature area 403 that may in some embodiments be contained within a display and include a digital image of the user's signature, and a card microprocessor processing device 404.

Figure 5:
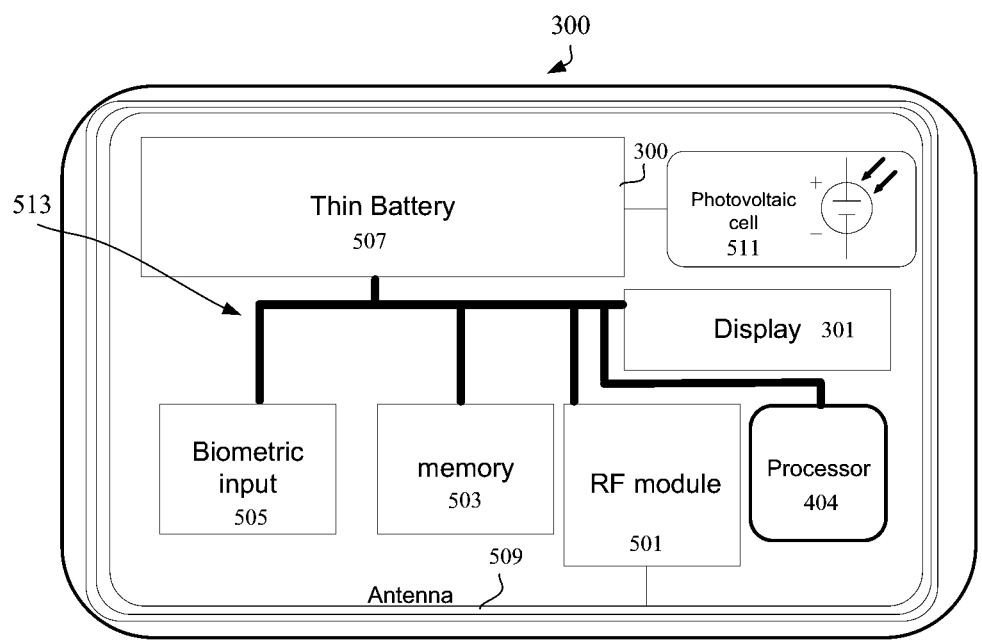
FIG. 5 is an interior view of the example wirelessly updated credit/debit card of FIG. 3 showing an example configuration of various high level components within the card.

Referring next to FIG. 5, shown is an interior view of the example wirelessly updated credit/debit card of FIG. 3 showing an example configuration of various high level components within the card. Shown is a microprocessor 404, a RF transceiver 501, an integrated antenna 509, a memory module 503, a biometric input module 505, a thin battery 507 connected to an energy supply such as a photovoltaic cell 511, an example display 301, and a system bus 513 communicatively connecting these major components.

The thin battery 507 is that which provides enough power to operate the other individual components within the card, such as batteries available from Thin Battery Technologies, Inc. located in Parma, Ohio. Example battery specifications are as follows: Thickness<0.4 mm, Voltage>2 Volts, Size 2.2×2.9 $cm^2$, rechargeable<3 nm, energy: 20 mAh. However, variations from these specifications are also possible.

The biometric input area 505 is an area that reads biometric identification data. This may be, for example, a thumb or fingerprint reader, voiceprint reader (using a built-in microphone), or facial feature data reader (using a built-in camera). The thumbprint reader may be, for example a silicon integrated sensor device such as those available from AuthenTec, Inc., located in Melbourne, Fla.

In some embodiments of the present disclosure, the RF transceiver 501 can send and receive long range RF signals such as cellular telephone signals. A suitable transceiver may be included in a RF transceiver integrated circuit chip such as the BCM2085 65-nm CMOS DigRF EDGE Cellular Transceiver, available from Broadcom Corporation located in Irvine, Calif. This example transceiver chip is a 65-nm CMOS single chip quad-band GSM/GPRS/EDGE RF transceiver for GSM850/EGSM900/DCS1800/PCS1900 voice and data applications. In other embodiments, the RF transceiver may include a Bluetooth transceiver, a 802.XX transmitter such as a WiMAX transceiver or a WiFi transceiver, or an active or passive RFID tag. Other suitable transceivers may include, but are not limited to, any transceiver that has wireless capabilities and a small form factor.

The antenna 509 is embedded within the card 300 and is operatively connected to the RF transceiver 501. The antenna 509 may be looped around the perimeter of the card and/or across the card 300 if the antenna 509 is located on a different plane within the card 300 than the other components for isolation purposes. In at least one embodiment, the antenna 509 may be an isolated magnetic Dipole™ (IMD) internal cellular antenna.

Figure 6:
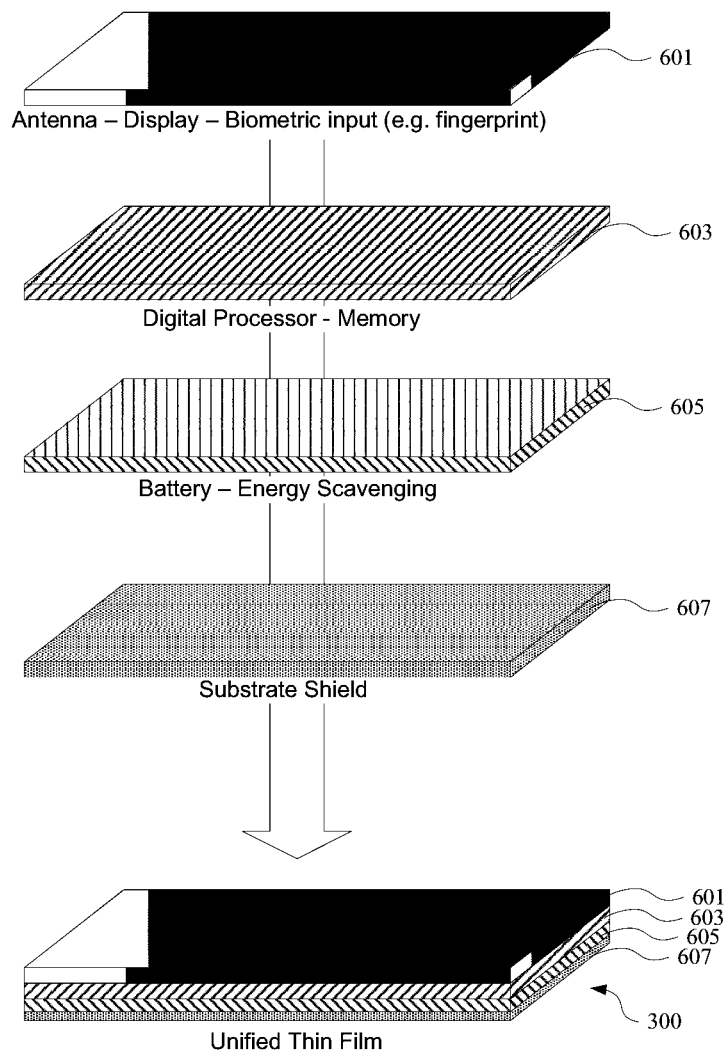
FIG. 6 is an exploded perspective side view of the wirelessly updated credit/debit card of FIG. 3 along with a perspective side view of a completed assembly of the card.

Referring next to FIG. 6, it depicts an exploded perspective side view of the wirelessly updated credit/debit card of FIG. 3, along with a perspective side view of a completed assembly of the card. Shown are four example layers. However, the number and type of layers may vary depending on the number and type of particular internal components included within the card 300. The top layer is the Antenna-Display-Biometric input layer 601. Next, coupled to the Antenna-Display-Biometric input (e.g. fingerprint) layer 601 is the Digital Processor-Memory layer 603. Coupled to the Digital Processor-Memory layer 603 is the Battery-Energy Scavenging layer 605. Finally, coupled to the Battery-Energy Scavenging layer 605 is the Substrate Shield layer 607. These layers all coupled together (with the substrate shield layer being an outside layer) form a unified thin film card assembly 300.

Figure 7:
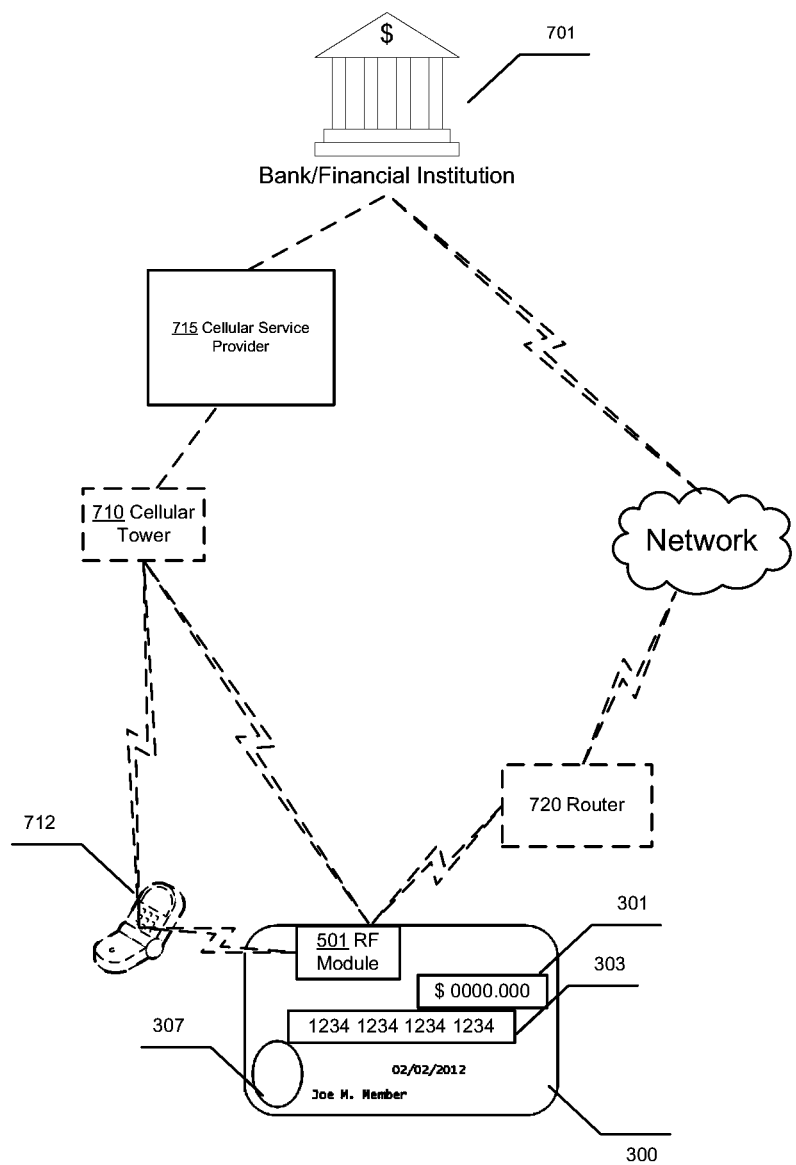
FIG. 7 is a diagram illustrating an example system in which the wirelessly updated credit/debit card of FIG. 3 is updated directly via a long range wireless network.

Referring now to FIG. 7, it illustrates an example system wherein aspects of the present disclosure may be embodied. The example system of FIG. 7 is described in more detail below with respect to how the elements depicted interrelate with the operational procedures illustrated in the flow charts FIG. 8 through FIG. 12. One skilled in the art will note that the example elements depicted in FIG. 7 are provided to illustrate an operational context to practice aspects of the present disclosure. Thus, the example operational context is to be treated as illustrative only and in no way limits the scope of the claims. Furthermore, those skilled in the art will note that some elements depicted in FIG. 7 are indicated in dashed lines, which in general, and throughout the disclosure, is indicative of the fact that they are considered optional and/or they are considered to be optionally located at their position within their respective figure.

Generally speaking, the exemplarily system includes a financial institution 701, that can include, or have access to, one or more databases of information that contain one or more user accounts. The one or more databases of information can be coupled to a database management program that can perform complex operations to control the organization, storage, and retrieval of data in the databases. The system of FIG. 7 additionally includes a card 300 similar to that described above that has an RF module 501 and one or more displays 301 and/or 303, for example. Additionally, the card 300 includes, in some embodiments, a biometric reader 307. As shown in FIG. 7, the RF module 501 of the card 300 can, in some embodiments, be in wireless communication with a long range wireless tower 710 that is electronically coupled to a long range wireless service provider 715, i.e., a provider of long range wireless signals such as signals in the cellular frequency band. In additional, or alternative embodiments of the present disclosure, and described in more detail below, the long range signal tower 710 may be in wireless communication with a user's cellular phone 712. In these, and other embodiments, the cellular phone 712 may be in wireless communication with the RF module 501 of the card 300. In this situation, the long range signal tower 710 may transmit information to the cellular phone 712, and the cellular phone may transmit the same, or additional information to the RF module 501 using a cellular signal or a short range RF signal such as Bluetooth or RFID. FIG. 7 additionally depicts a close proximity RF system such as the router 720 of FIG. 7. The router 720 may include, but is not limited to, one or more hardware modules that include circuitry for enabling the router 720 to communicate utilizing an 802 protocol such as 802.11 (WiFi) or 802.16 (WiMAX).

Figure 8:
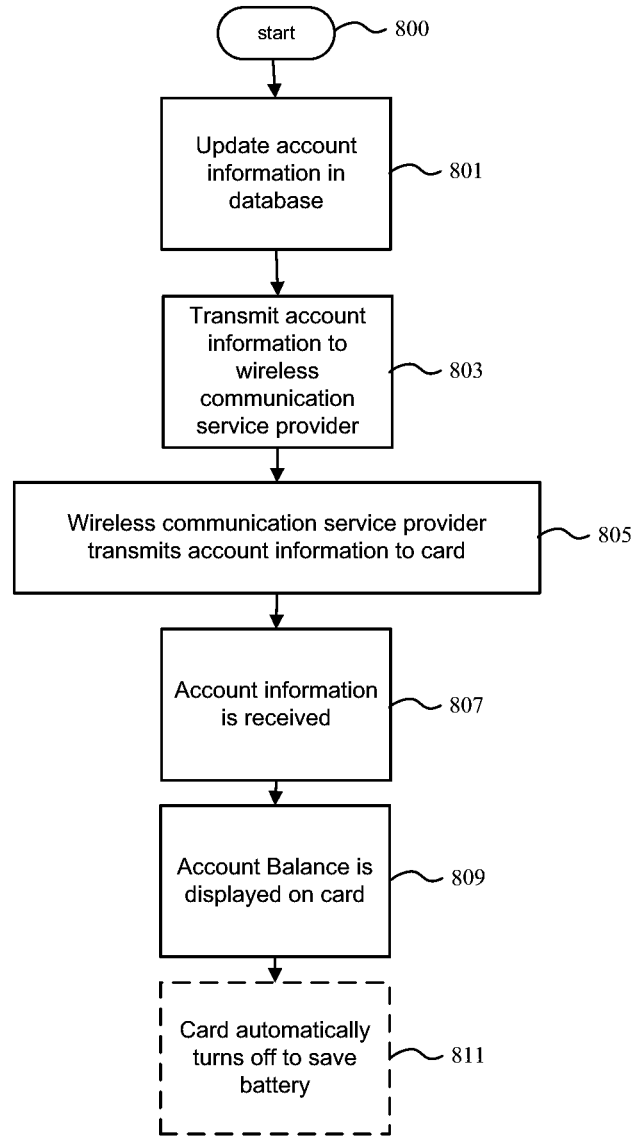
FIG. 8 is a flow diagram illustrating an example operational process in which the wirelessly updated credit/debit card of FIG. 3 is updated utilizing a long range wireless network.

Referring now to FIG. 8, it illustrates an example operational flow chart 800 that depicts aspects of the present disclosure. Operation 801 illustrates updating a financial institution's database with information related to a user account. These updates may be made, for example, by utilizing point of sale transaction terminals that are currently in use in most retail stores that handle credit/debit transactions. Or, in the same, or another embodiment, the update may be some other activity that affects the balance of an account, i.e., the update may be a paycheck deposit, ACH payment withdrawal, fees charged by the bank, interest paid, etc. A specific example of how a point of sale terminal is utilized in aspects of the present disclosure may include one or more credit card readers that can access the account information stored within the card when the user makes a purchase. Information related to the transaction can then be sent through one or more networks to the issuer of the card, or to a processing center that is configured to authorize credit/debit transactions for one or more financial institutions. The database may include one or more programs, or modules, for determining when to authorize charges to the account and one of these programs or modules may be invoked to determine whether or not to authorize or deny the transaction. In the event that the transaction is authorized, the financial institution 701 may then transmit an authorization message back through the network to the (POS) terminal and a receipt can be printed for the user. In accordance with at least one embodiment of the present disclosure, one or more programs or modules may monitor transaction activity of the user's account, and update the user's account to reflect the transaction, i.e., in a debt card scenario, the account of the user may be debited, and in a credit card scenario the available balance of the card may be updated.

As illustrated by operation 803, in this example embodiment, after the user account is updated with information related to the transaction, the financial institution 701 can transmit a signal indicative of the account information to the cellular service provider 715. For example, the financial institution 701 may be affiliated with one or more cellular providers and the financial institution 701 can transmit one or more packets of information indicative of the balance in a user's account to the cellular provider's network operations center.

A specific example of what information can be transmitted may include sending a signal that identifies that the transaction has taken place, i.e., if a user with an account balance of $1000.00 makes a purchase of $600.00 with their debit card, once the user's account in the database is updated with information indicative of the transaction, a signal indicative of the new balance, in this example $400.00, can be transmitted to the cellular tower 710. Another specific example may include, but is not limited to, a financial institution 701 transmitting a signal indicative of the current transaction instead of the resulting balance to the cellular tower 710. In this embodiment, the card 300 may contain a record of the user's transactions, and the card 300 may use an adding/subtracting function of the CPU of the card 300 to modify the transaction record stored within the card 300 to obtain the account's current balance. While two different specific examples of operation 803 are disclosed, one skilled in the art will appreciate that these are exemplary and that other types of information may be transmitted in operation 803.

Once the long range signal service provider 715 receives the account information, it can be transmitted to the card as illustrated by operation 805. The account information (possibly encrypted) can be sent to address of the card 300. For example, the card 300 may include information that identifies it to the wireless network it is in communication with. In the example where the wireless network is a cellular network, the card 300 may have been previously assigned a number by the long range signal provider 715 that is stored in a database along with an association relating it to the number to the account of the user maintained by the financial provider, i.e., a database table may associate account "1234 1234 1234 1234" to phone number "555-555-5555." In some embodiments, once the account information is received by the long range signal service provider 715, it may wirelessly transmit the information to the card 300 as depicted by operation 807. In this situation, the long range signal service provider 715 may transmit the information at predetermined intervals, for example, after the card 300 transmits a packet of information indicative of a request for the account information, or the account information can be pushed to the card as soon as it receives the information and identifies where the card is in the network, i.e., by sending a location update request to the card 300.

In at least one other embodiment of the present disclosure, the account information may be transmitted to the card 300 when the RF module 501 is activated. In this embodiment of operation 807, the card 300 user turns on/activates the RF module 501 in order to receive the account information. This activation may be accomplished by, for example, touching the biometric input area 307 (or an alternative input area, i.e., transmit/receive button) of the card 300. In this example, after the user touches the biometric input area 307 the RF module may connect with the cell tower 710 to receive the account balance.

As illustrated in operation 809, the account information can then be displayed on the screen(s). The information displayed may be, for example, account balance, status, recent transaction information, advertisements, a graphic image, any other alert or message, or any combination of these items. This information may also be stored in memory on the card for buffering or for a variety of future uses such as to compare old data with new data being received. In some embodiments, the card 300 may automatically turn off as illustrated by optional operation 811 via a timer to save battery and/or for security purposes.

Figure 9:
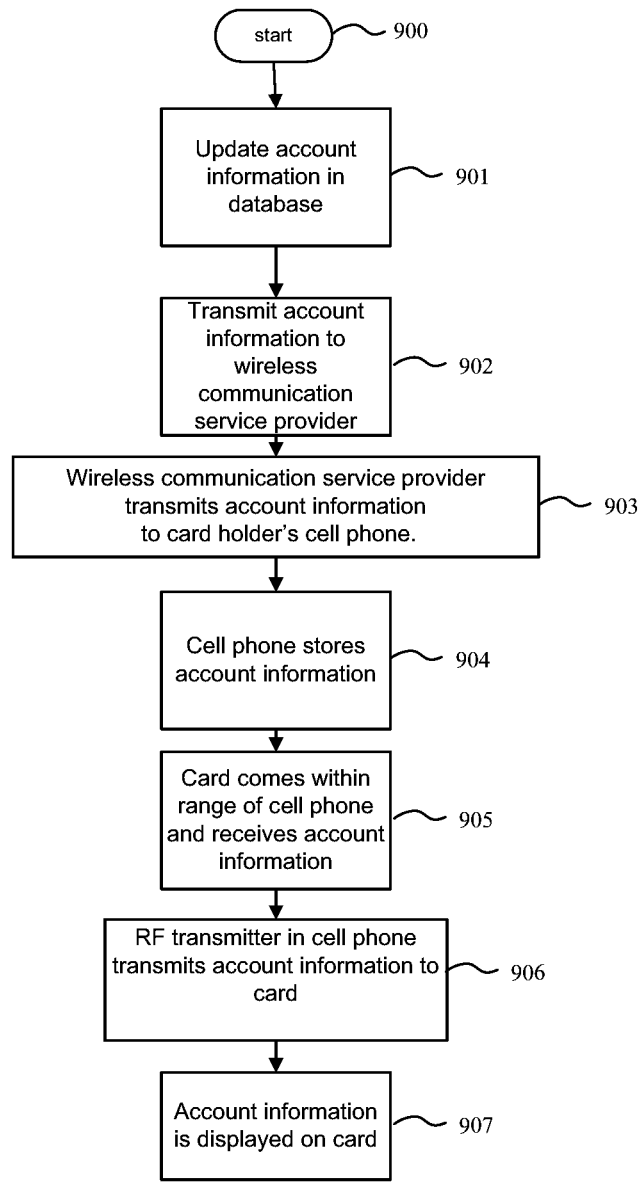
FIG. 9 is a flow diagram illustrating an example process in which the wirelessly updated credit/debit card of FIG. 3 is updated utilizing a mobile device.

Referring next to FIG. 9, it illustrates an example operational flow chart in which the wirelessly updated credit/debit card of FIG. 3 is updated via a card holders cellular phone 712. As depicted by operation 901, a financial institution's database is updated with card account information similar to that described above with respect to operation 801. This account information is transmitted 902 to a wireless communication service provider. This may be a long range signal service provider 715, for example. As shown by operation 903, the long range signal service provider 715 can then start transmitting (possibly encrypted) account information to the specific phone number of the cellular phone 712 or other portable wireless digital device of the account holder. As shown by operation 904, the cell phone can then store the account information in, for example, memory of the cellular phone 712 such as RAM, and then the transceiver (not shown) in the cell phone 712 can start transmitting the encrypted account information to the card 300 once the phone and the card are connected to each other as illustrated by operation 905 and 906. For example, in some embodiments of the present disclosure, the cellular phone 712 may include an RFID reader for example. In this embodiment the card may include a passive, or active, RFID tag that is configured to be reprogrammed with information transmitted by the phone when a RFID tag comes within range of the cell phone's RFID tag reader (not shown). Another specific example may include both the cellular phone of the user and the card including Bluetooth adapters. In this example, when the card comes in close range of the phone, the two Bluetooth adapters may connect and the phone may transmit the account information to the card. This account information is then displayed 907 on the card 300, when, for example, the user activates their card by placing their finger on the biometric reader 307.

Figure 10:
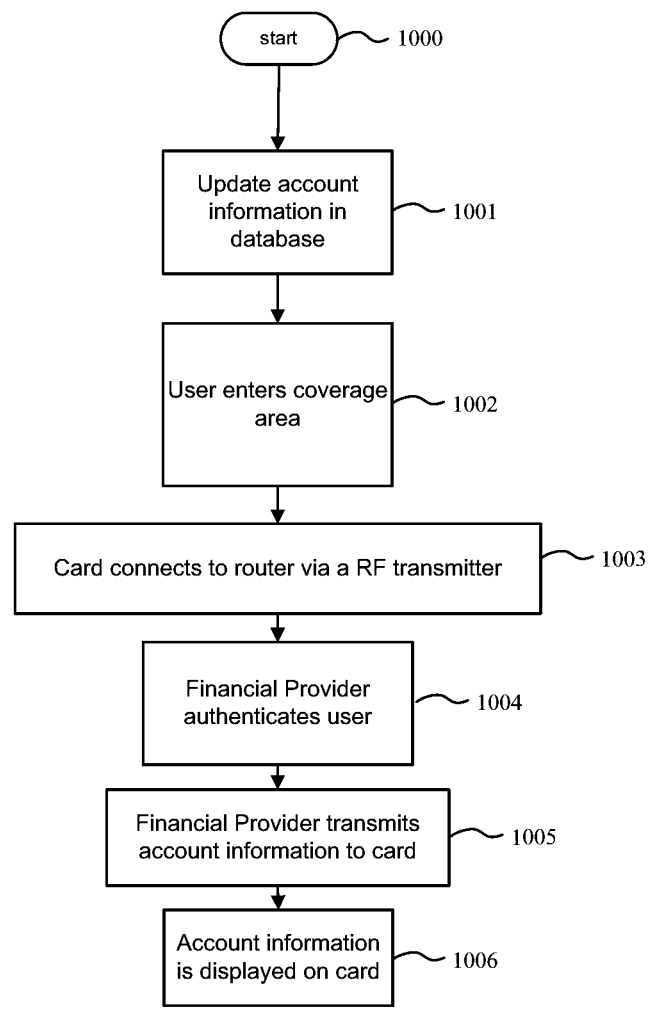
FIG. 10 is a flow diagram illustrating an example operational process in which the wirelessly updated credit/debit card of FIG. 3 is updated utilizing a wireless network.

Referring next to FIG. 10, it depicts an operational flow chart illustrating an example operational process in which the wirelessly updated credit/debit card of FIG. 3 is updated via, for example, a WiFi, WiMAX, or other local area or metropolitan area computer network. First, the financial institution's 701 database is updated 1001 with card account information similar to that described above with respect to operation 801. As illustrated by operation 1002, the user may enter an area that includes coverage provided by one or more routers utilizing technology such as WiMax, or WiFi. Then, as shown by operation 1003, the card 300, can connect to such a network and transmit one or more packets of information indicative of a request to access the user's account and receive the user's balance. In some embodiments, this may be accomplished by providing the card 300 with hardware, software, or firmware configured to connect to any available public network and submit a http, or secure http, request to the router associated with the WiMax or WiFi router in the coverage area. The router can then submit the request to an internet service provider (ISP) wherein the ISP may route the request to one or more other ISPs until the request arrives at a server maintained by the financial provider 701. As shown by operation 1004, the user can be validated by the financial provider 701. In response, the server may transmit one or more packets of information indicative of account information back throughout the system to the card 300 as shown by operation 1005, and thereafter the available balance of the user may be displayed on the screen 301 of the card 300 as illustrated by operation 1006.

Figure 11:
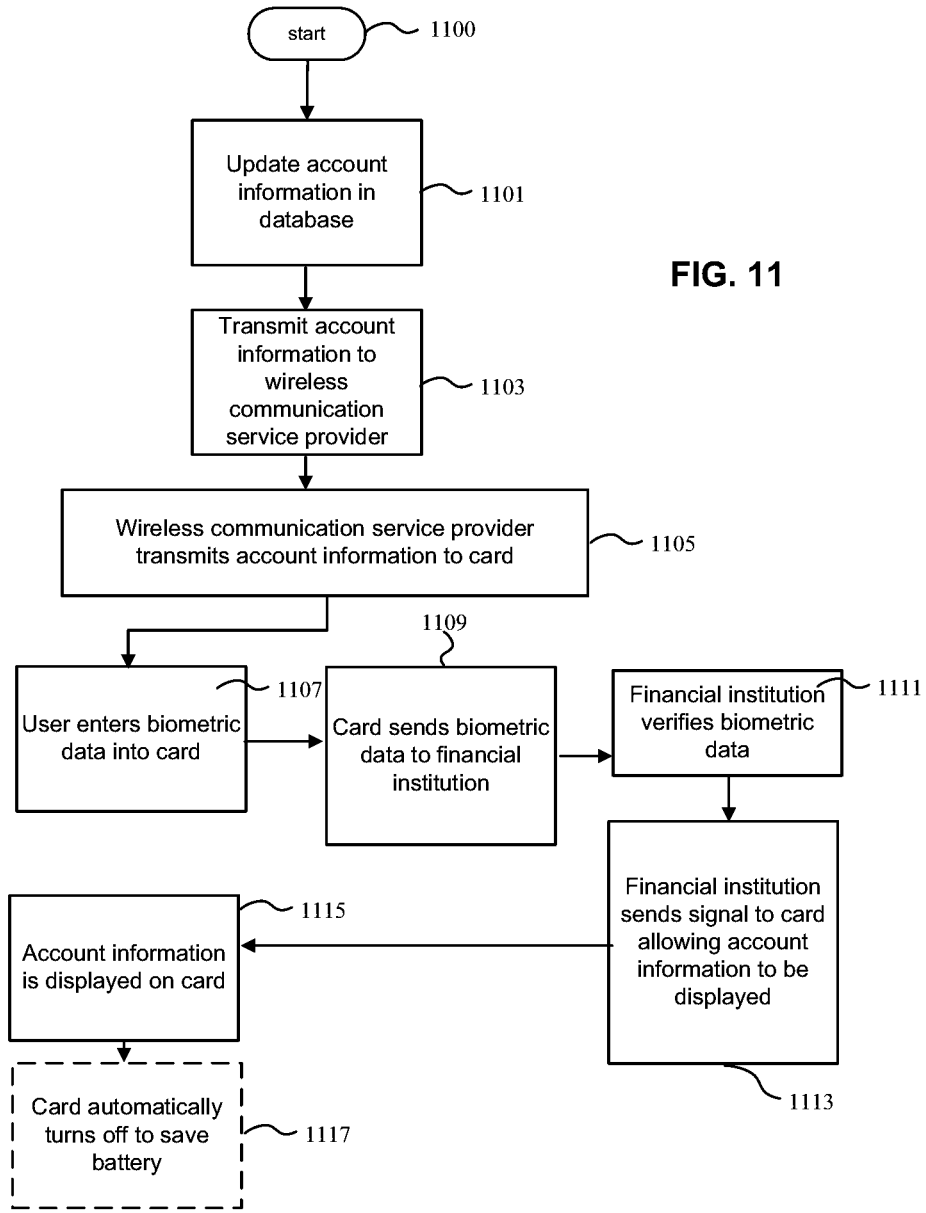
FIG. 11 is a flow diagram illustrating an example process in which the wirelessly updated credit/debit card of FIG. 3 utilizes biometric security features.

Referring next to FIG. 11, it depicts an operational flow chart illustrating aspects of the present disclosure including biometric security features. In some embodiments of the present disclosure, instead of continuously displaying the information in the display, the screen may display information when the user is authenticated. This reduces the likelihood that an unauthorized user will obtain the card number or the balance of the account, for example. In this example, the financial institution's 701 database is updated 1101 with card account information. This updated account information is transmitted 1103 to a long range signal service provider 715, or in other embodiments accessible through an internet connection provided by a WiMAX network for example. As depicted by operation 1105, the long range signal service provider 715 can transmit (possibly encrypted) account information to the specific phone number/or network address of the card 300. At some point, the card user can turn on/activate 1107 the card 300 to receive the account information through the wireless transceiver 501 in the card 300. This activation may be accomplished, for example, by touching the biometric input area 307 (or an alternative input area) of the card 300, The biometric data captured by the biometric reader (e.g., thumbprint reader 505) can then be stored, for example, temporarily on the card memory module 503. The card can then send 1109 biometric data via the long range signal service provider 715, or the internet connection maintained by a router(s) 720 associated with a local area network to the financial institution 701. The financial institution 701 can then verify 1111 the biometric data (the card holder having previously provided their biometric data to the financial institution for security purposes). The financial institution can then send 1113 a signal to the card 300 via the long range long range signal service provider 715 for example, to allow account information to be displayed. The received account information is then displayed 1115 on the display 301. The information received and/or displayed on the display 301 may be, for example, account balance, status, recent transaction information, advertisements, a graphic image, any other alert or message, or any combination of these items. This information may also be stored in memory on the card for buffering or for a variety of future uses such as to compare old data with new data being received. Optionally, the card 300 may automatically turn off 1117 via a timer used by the card processor 404 to save battery and/or for security purposes.

Operational flow 1200 of FIG. 12 illustrates an example operational flow that depicts biometric security features of the present disclosure. For example, as illustrated by FIG. 12, operation 1201 illustrates a user entering their biometric information. As discussed earlier, biometric information may include, but is not limited to, the user's thumbprint, voice profile, facial features, or any other biometric information. As shown by operation 1201, the biometric receiver on the card 300 may receive the information and, in some embodiments, process the information utilizing the card's 404 microprocessor in order to determine if the user is authorized. For example, when the card 300 is issued to the user, the issuer (the financial services provider 701) may capture the thumbprint or take a picture of the user. In this example, the image of the print or user can be digitized and stored in the card's memory 503, i.e., in nonvolatile read only memory. When the information is received by the biometric receiver 505 it may process (utilizing the processor 404) the information and attempt to match the received image to the image stored in memory 503 using a matching algorithm or technique as shown by operation 1202. As shown by operation 1204, in the event that the user is authorized, i.e., the biometric information of the user matches the stored digital file, the display 301, 302, 303, etc. of the card may be energized and display any information otherwise the operational procedure may stop at 1203. As illustrated by operation 1205, some information may not need to be updated such as the account number, expiration date, user's signature, etc. This type of information may be immediately displayed in the screen in operation 1206. Other type of account information, such as the available balance of the user may need to be updated before it can be displayed. In this situation, the RF transceiver 501 of the card can be activated at 1207 and the updated account information may be received at 1208 before being displayed to the user The various systems, methods, and techniques described herein may be implemented with hardware or software or, where appropriate, with a combination of both. Thus, the methods and apparatus of the present disclosure, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language and combined with hardware implementations.

The methods of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the disclosure. When implemented on a general-purpose processor, the program code combines with the processor to provide a unique apparatus that operates to perform the functionality of the systems and methods described herein.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

The foregoing detailed description has set forth various embodiments of the systems and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method, comprising:
   providing a financial account identifier from a mobile electronic card to a point-of-sale transaction terminal, the financial account identifier associated with a financial account of a user of the mobile electronic card;
   wirelessly receiving encrypted updated account information regarding the financial account of the user on a cellular telephone associated with the user;
   storing the encrypted updated account information regarding the financial account of the user on the cellular telephone associated with the user;
   connecting a wireless communication adapter of the cellular telephone associated with the user and a wireless communication adapter of the mobile electronic card;
   transmitting the encrypted updated account information regarding the financial account of the user from the wireless communication adapter of the cellular telephone to the wireless communication adapter of the mobile electronic card;
   receiving biometric information on the mobile electronic card;
   determining that the biometric information is valid, wherein determining includes sending the biometric information to a financial institution associated with the financial account of the user for verification by the financial institution that the sent biometric information matches biometric data provided to the financial institution for security purposes;
   activating a display of the mobile electronic card responsive to a signal from the financial institution confirming the verification; and
   displaying a balance of the financial account information on the display of the mobile electronic card for a predetermined time period based on the receiving of the encrypted updated account information and the signal from the financial institution, wherein the encrypted updated account information includes a signal indicative of a most recent transaction and the displayed balance of the financial account is calculated at the mobile electronic card from the signal indicative of the most recent transaction and a transaction record stored in the mobile electronic card, and wherein the display includes a portion configured to display a digital image of a signature associated with the user.

2. The method of claim 1, further comprising:
   receiving a request location for the mobile electronic card; and
   transmitting a location in response to the receiving of the request location,
   wherein the wirelessly receiving of the encrypted updated account information is in response to the transmitting.

3. The method of claim 1, wherein the encrypted updated account information includes the balance of the financial account.

4. The method of claim 1, further comprising:
   activating a wireless transceiver of the mobile electronic card based on the providing of the financial account identifier,
   wherein the wirelessly receiving is based on the activating of the wireless transceiver.

5. The method of claim 1, further comprising:
   transmitting an association number of the mobile electronic card to the cellular telephone,
   wherein the wirelessly receiving of the encrypted updated account information is in response to the transmitting.

6. A non-transitory computer readable storage medium including computer readable instructions, which when executed by a computer, cause the computer to:
   provide a financial account identifier from a mobile electronic card to a point-of-sale transaction terminal, the financial account identifier associated with a financial account of a user of the mobile electronic card;
   wirelessly receive encrypted updated account information regarding the financial account of the user on a cellular telephone associated with the user;
   store the encrypted updated account information regarding the financial account of the user on the cellular telephone associated with the user;
   connect a wireless communication adapter of the cellular telephone associated with the user and a wireless communication adapter of the mobile electronic card;
   transmit the encrypted updated account information regarding the financial account of the user from the wireless communication adapter of the cellular telephone to the wireless communication adapter of the mobile electronic card;
   receive biometric information on the mobile electronic card;
   determine that the biometric information is valid, wherein determining includes sending the biometric information to a financial institution associated with the financial account of the user for verification by the financial institution that the sent biometric information matches biometric data provided to the financial institution for security purposes;
   activate a display of the mobile electronic card responsive to a signal from the financial institution confirming the verification; and
   display a balance of the financial account information on the display of the mobile electronic card for a predetermined time period based on receipt of the encrypted updated account information and the signal from the financial institution, wherein the encrypted updated account information includes a signal indicative of a most recent transaction and the displayed balance of the financial account is calculated at the mobile electronic card from the signal indicative of the most recent transaction and a transaction record stored in the mobile electronic card, and wherein the display includes a portion configured to display a digital image of a signature associated with the user.

7. The computer readable storage medium of claim 6, further comprising instructions that cause the machine to:
   receive a request location for the mobile electronic card; and
   transmit a location in response to the receiving of the request location,
   wherein wirelessly receiving the encrypted updated account information is in response to transmission of the location.

8. The computer readable storage medium of claim 6, wherein the encrypted updated account information includes the balance of the financial account.

9. The computer readable storage medium of claim 6, further comprising instructions that cause the machine to:
  activate a wireless transceiver of the mobile electronic card based on providing the financial account identifier,
  wherein wirelessly receiving is based on activation of the wireless transceiver.

10. A system comprising:
  a mobile electronic card; and
  a cellular telephone associated with a user;
  wherein the mobile electronic card includes a memory and a processor to:
    provide a financial account identifier from the mobile electronic card to a point-of-sale transaction terminal, the financial account identifier associated with a financial account of the user of the mobile electronic card;
  wherein the cellular telephone associated with the user includes a wireless communication adapter and memory to:
    receive and store encrypted updated account information regarding the financial account of the user and transmit the encrypted updated account information regarding the financial account of the user;
  wherein the mobile electronic card associated with the user includes a wireless communication adapter coupled to the memory and the processor of the mobile electronic card to wirelessly connect and receive the encrypted updated account information regarding the financial account of the user directly from the wireless communication adapter of the cellular telephone associated with the user based on providing the financial account identifier;
  wherein the mobile electronic card associated with the user includes a biometric information module coupled to the memory and the processor of the mobile electronic card to:
    receive biometric information on the mobile electronic card,
    determine that the biometric information is valid, wherein determining includes sending the biometric information to a financial institution associated with the financial account of the user for verification by the financial institution that the sent biometric information matches biometric data provided to the financial institution for security purposes, and
    activate a display of the mobile electronic card responsive to a signal from the financial intuition confirming the verification; and
  wherein the mobile electronic card associated with the user includes the display coupled to the memory and the processor of the mobile electronic card to display a balance of the financial account information for a predetermined time period based on receipt of the updated account information and the activation of the display, wherein the encrypted updated account information includes a signal indicative of a most recent transaction and the displayed balance of the financial account is calculated at the mobile electronic card from the signal indicative of the most recent transaction and a transaction record stored in the mobile electronic card, and wherein the display includes a portion configured to display a digital image of a signature associated with the user.

11. The system of claim 10, further comprising:
  wherein the mobile electronic card receives a location request for the mobile electronic card and transmits a location in response to receipt of the location request,
  wherein wirelessly receiving of encrypted updated account information is in response to transmission of the location.

12. The system of claim 10, wherein the encrypted updated account information includes the balance of the financial account.

13. The system of claim 10, wherein the mobile electronic card further comprises:
  an activation module to activate a wireless transceiver of the mobile electronic card based on the providing of the financial account identifier;
  wherein wirelessly receiving is based on activation of the wireless transceiver.

* * * * *

UNITED STATES PATENT AND TRADEMARK OFFICE
CERTIFICATE OF CORRECTION

PATENT NO. : 8,820,638 B1
APPLICATION NO. : 11/829838
DATED : September 2, 2014
INVENTOR(S) : Judy M. Cotter and Reynaldo Medina, III Page 1 of 1

It is certified that error appears in the above-identified patent and that said Letters Patent is hereby corrected as shown below:

In the Claims

Column 18, Line 7, In Claim 10, delete "intuition" and insert -- institution --

Signed and Sealed this
Seventeenth Day of February, 2015

Michelle K. Lee
*Deputy Director of the United States Patent and Trademark Office*